United States Patent
Leachman et al.

(10) Patent No.: US 8,276,255 B2
(45) Date of Patent: Oct. 2, 2012

(54) METHODS FOR PRODUCING AND MOUNTING BALANCE RINGS TO VEHICULAR ELECTRIC MACHINES

(75) Inventors: Ronald M. Leachman, Commerce Township, MI (US); Margarita Thompson, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/227,284

(22) Filed: Sep. 7, 2011

(65) Prior Publication Data

US 2011/0314659 A1      Dec. 29, 2011

Related U.S. Application Data

(62) Division of application No. 12/402,290, filed on Mar. 11, 2009, now abandoned.

(51) Int. Cl.
*H01R 43/06* (2006.01)

(52) U.S. Cl. .......................... 29/597; 29/596; 310/51

(58) Field of Classification Search ............ 29/596–598; 310/51, 67 R, 156.04
See application file for complete search history.

(56) References Cited

U.S. PATENT DOCUMENTS

| | | | |
|---|---|---|---|
| 4,144,469 A | 3/1979 | Miyashita et al. | |
| 4,896,813 A | 1/1990 | Saijo et al. | |
| 4,933,583 A * | 6/1990 | Ripplinger | 310/156.22 |
| 5,780,945 A | 7/1998 | Caviglia et al. | |
| 6,184,606 B1 | 2/2001 | Pyrhönen | |
| 6,448,675 B1 * | 9/2002 | Horng et al. | 310/67 R |
| 6,483,209 B1 * | 11/2002 | Horng et al. | 310/51 |
| 6,727,628 B2 | 4/2004 | Shimada et al. | |
| 7,271,518 B2 * | 9/2007 | Horng et al. | 310/190 |
| 2004/0124733 A1 | 7/2004 | Yamamoto et al. | |
| 2005/0006962 A1 * | 1/2005 | Horng | 310/51 |
| 2009/0033160 A1 | 2/2009 | Mueller | |

FOREIGN PATENT DOCUMENTS

JP     62002839 A     1/1987

OTHER PUBLICATIONS

U.S. Office Action, dated Jun. 11, 2010, for U.S. Appl. No. 12/402,290.
U.S. Office Action, dated Nov. 26, 2010, for U.S. Appl. No. 12/402,290.
U.S. Final Office Action, dated Apr. 22, 2010, for U.S. Appl. No. 12/402,290.
Amamiya et al, JP 62002839 Translation, Jan. 1987.

* cited by examiner

*Primary Examiner* — Minh Trinh
(74) *Attorney, Agent, or Firm* — Ingrassia Fisher & Lorenz, P.C.

(57) ABSTRACT

Methods for fabricating a balance ring for a vehicular electric machine are provided. In one embodiment, the method includes the steps of providing a first metal layer having a first planar surface, providing a second metal layer having a second planar surface, cladding the second planar surface to the first planar surface to form a composite structure, and removing a portion of the composite structure to form an annular ring.

10 Claims, 4 Drawing Sheets

METHODS FOR PRODUCING AND MOUNTING BALANCE RINGS TO VEHICULAR ELECTRIC MACHINES

CROSS-REFERENCES TO RELATED APPLICATIONS

This application is a divisional of U.S. patent application Ser. No. 12/402,290, filed Mar. 11, 2009 now abandoned.

TECHNICAL FIELD

The present invention generally relates to vehicular electric machines, and more particularly relates to a balance ring for a vehicular electric machine and to methods for making same.

BACKGROUND

In recent years, advances in technology have led to substantial changes in the design of automobiles. One of these changes involves the complexity, as well as the power usage, of various electrical systems within automobiles, particularly alternative fuel vehicles. For example, alternative fuel vehicles such as hybrid vehicles often use electrochemical power sources, such as batteries, ultracapacitors, and fuel cells, to power the electric traction machines (including electric motors and motor/generators) that drive the wheels, sometimes in addition to another power source, such as an internal combustion engine.

Such electric machines typically include a rotor assembly that rotates axially on a shaft within a stationary stator. Because rotor assemblies of traction electric machines may rotate at thousands of revolutions per minute (rpm), minor anomalies in the balance of such assemblies can result in undesirable vibrations, premature wear of bearings and shafts, and reduced machine life. To compensate for such imperfections and maintain balance at high speeds, annular metallic balance rings having an asymmetric weight distribution are typically mounted on one or both ends of a rotor concentric to the shaft. The ring is machined as necessary to remove weight at specific points along the circumference of the ring customized for and complementary to the imbalances of a particular rotor. Ideally, balance rings are characterized by both high mechanical strength to withstand the forces generated when rotating at high rpm's, and low magnetic permeability ($\mu$) to contain magnetic flux within the rotor assembly to improve overall machine efficiency. Balance rings fabricated as a unistructure from such metals as stainless steel offer both of these characteristics, but are prohibitively expensive. Materials such as aluminum are relatively inexpensive and offer high magnetic shielding but have insufficient mechanical strength for many applications. Other inexpensive materials such as carbon steel offer high mechanical strength but provide little or no magnetic shielding.

Composite balance rings fabricated as a bi-layer structure comprised of two different powdered metals have been used as a means of combining both high magnetic shielding and mechanical strength. For example, a layer of a first powdered metal having a low $\mu$ such as stainless steel, may be combined with a layer of a second powdered metal having low cost and high strength, such as carbon steel. The two layers are then sintered together to form a balance ring which is then machined for a particular rotor. However, metals in powder form are significantly more expensive than metals in other, more common forms such as rolled sheets. Further, sintered stainless steel tends to work harden during machining, making it an especially difficult material to process. In addition, sintered balance rings are subject to cracking during such machining. Such cracks may be difficult to identify during the manufacturing process, and thus may result in a failure of the ring when loaded at high speeds.

Accordingly, it is desirable to provide a balance ring for a vehicular electric machine that has both low magnetic permeability and high mechanical strength using inexpensive starting materials. Further, it is also desirable if such balance rings are easier to machine and less susceptible to forming cracks. Furthermore, other desirable features and characteristics of the present invention will become apparent from the subsequent detailed description and the appended claims, taken in conjunction with the accompanying drawings and the foregoing technical field and background.

SUMMARY

In accordance with an embodiment, by way of example only, an electric machine for deployment in a vehicle, with the electric machine having a housing, is provided. The electric machine comprises a stator assembly coupled to the housing, and a rotor assembly disposed within the stator assembly and configured to rotate relative thereto. A balance ring is coupled to an end of the rotor assembly and is configured to rotate therewith. The balance ring comprises an annular base layer having a first planar surface, and an annular magnetic shielding layer having a second planar surface clad to the first planar surface.

Methods are further provided for fabricating a balance ring for a vehicular electric machine. In accordance with an exemplary embodiment of the invention, one method comprises the steps of providing a first metal layer having a first planar surface, providing a second metal layer having a second planar surface, and cladding the second planar surface to the first planar surface to form a composite structure.

DESCRIPTION OF THE DRAWINGS

A more complete understanding of the present invention may be derived by referring to the detailed description and claims when considered in conjunction with the following figures, wherein like reference numbers refer to similar elements throughout the figures, and:

DESCRIPTION OF EXEMPLARY EMBODIMENTS

The various embodiments of the present invention described herein provide a balance ring for a rotor assembly of an electric machine suitable for deployment on a vehicle, and methods for making such a balance ring. The electric machine may comprise an electric generator or an electric motor, or a combination of these (motor/generator). The balance ring has a composite structure made by cladding a sheet or casting of a magnetically shielding layer to a sheet or casting of a base metal layer. The magnetically shielding layer helps to contain magnetic flux within the rotor assembly during operation, and is characterized by a low magnetic permeability. The base metal layer is made from a relatively inexpensive material to reduce overall cost, and provides high mechanical strength suitable to withstand the forces generated by high rates of rotation. The cladding of sheet/cast metals provides a balance ring that is easier to machine and less susceptible to cracking during machining than previous sintered powdered metal designs. Metals in sheet/cast form are also considerably less expensive than powdered metals of like composition, and thus the overall cost of the balance ring is reduced.

Figure 1:
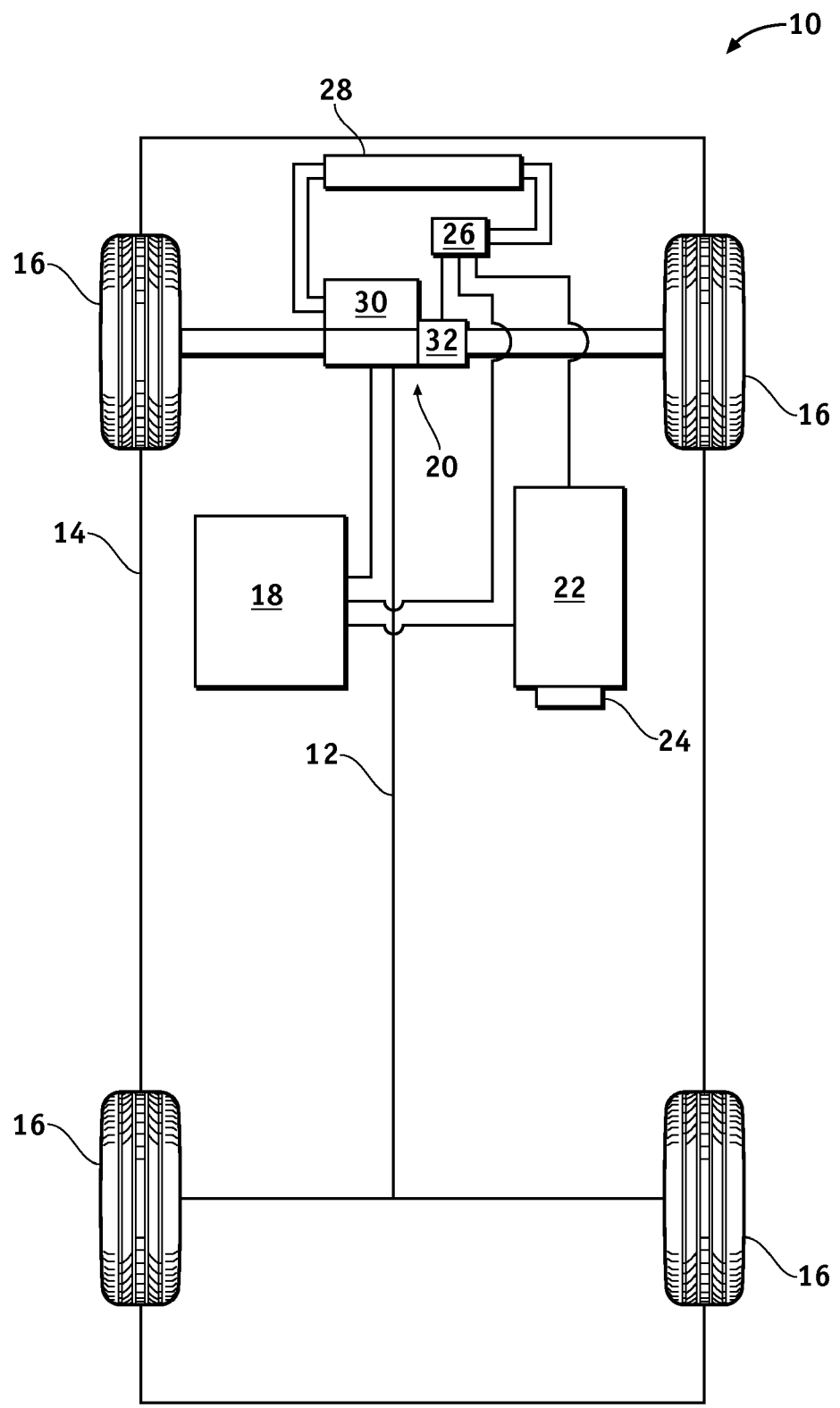
FIG. 1 is a schematic view of an exemplary vehicle illustrating the manner in which an embodiment is integrated with various sub-components of the vehicle.

FIG. 1 illustrates a vehicle, such as an automobile, 10 according to one embodiment of the present invention. The automobile 10 includes a chassis 12, a body 14, four wheels 16, and an electronic control system (or electronic control unit (ECU)) 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor/generator hybrid engine, and an electric motor.

In the exemplary embodiment illustrated in FIG. 1, the automobile 10 is a fuel cell vehicle, and further includes an actuator assembly (or powertrain) 20, a battery 22, a battery state of charge (SOC) system 24, a power electronics bay (PEB) 26, and a radiator 28. The actuator assembly 20 includes an internal combustion (IC) engine 30 and an electric motor/generator (or traction motor/generator) system (or assembly) 32. The battery 22 is electrically coupled to the PEB 26 and, in one embodiment, comprises a lithium ion (Li-ion) battery including a plurality of cells, as is commonly understood. Traction motor/generator assembly 32 typically comprises a plurality of electronic components, including stator and rotor assemblies. The rotor assembly includes at least one balance ring fabricated as a composite metallic cladding, machined as necessary to provide balance to the rotor assembly when operating at high rates of rotation. In the exemplary embodiment illustrated in FIG. 1, traction motor/generator assembly 32 is deployed as part of actuator assembly 20. This example notwithstanding, traction motor/generator assembly 32 may be deployed elsewhere within vehicle 10 in alternative embodiments. For example, in certain embodiments, the traction motor generator assembly may be located inside a transmission, or as part of the belt alternator stator system (BAS), and connected to an IC engine by a belt or other suitable means.

Figure 2:
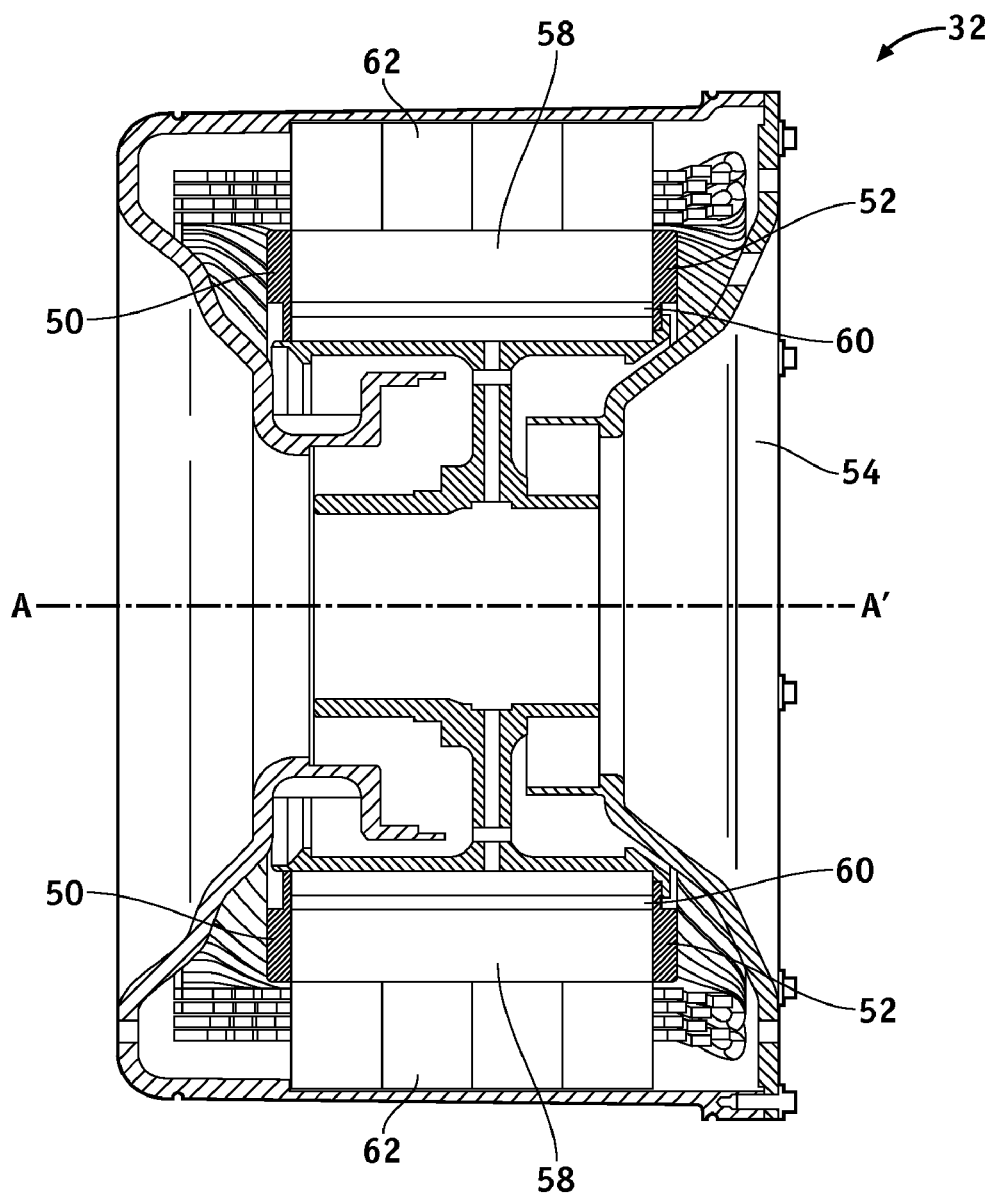
FIG. 2 is a schematic view of an exemplary vehicular traction electric machine for use with the vehicle depicted in FIG. 1, and having an integrated balance ring in accordance with an exemplary embodiment.

FIG. 2 schematically illustrates traction motor/generator assembly 32 having integrated balance rings 50 and 52 in accordance with an exemplary embodiment. Traction motor/generator assembly 32 includes a stator 62 contained within and fixedly coupled to a housing 54. A rotor assembly 58 is rotatably coupled to stator 62, and rotates substantially concentrically thereto about an axis A-A' on a shaft (not shown). Depending upon its design, assembly 58 may also include a plurality of magnets 60 configured to interact with magnetic flux generated by stator 62 and provide torque to rotor assembly 58 in a well known manner. A first balance ring 50 and a second balance ring 52 are each mounted substantially concentric to axis A-A' by, for example, pressed fitting, on opposite ends of rotor assembly 58. Rings 50 and 52 are configured to compensate for asymmetries in the mass distribution of rotor assembly 58 that may otherwise cause assembly 58 to vibrate when rotating. Rings 50 and 52 are each fabricated as bi-layer composite structures comprised of two metal sheets and/or castings of differing composition clad together in a manner to be described in greater detail below. During operation, rotor assembly 58 rotates about axis A-A' concentrically within stator 62 generating mechanical energy thereby. Balance rings 50 and 52 rotate with rotor assembly 58, each ring having an asymmetrical mass distribution configured to counterbalance/complement rotational imbalances within assembly 58.

Figure 3:
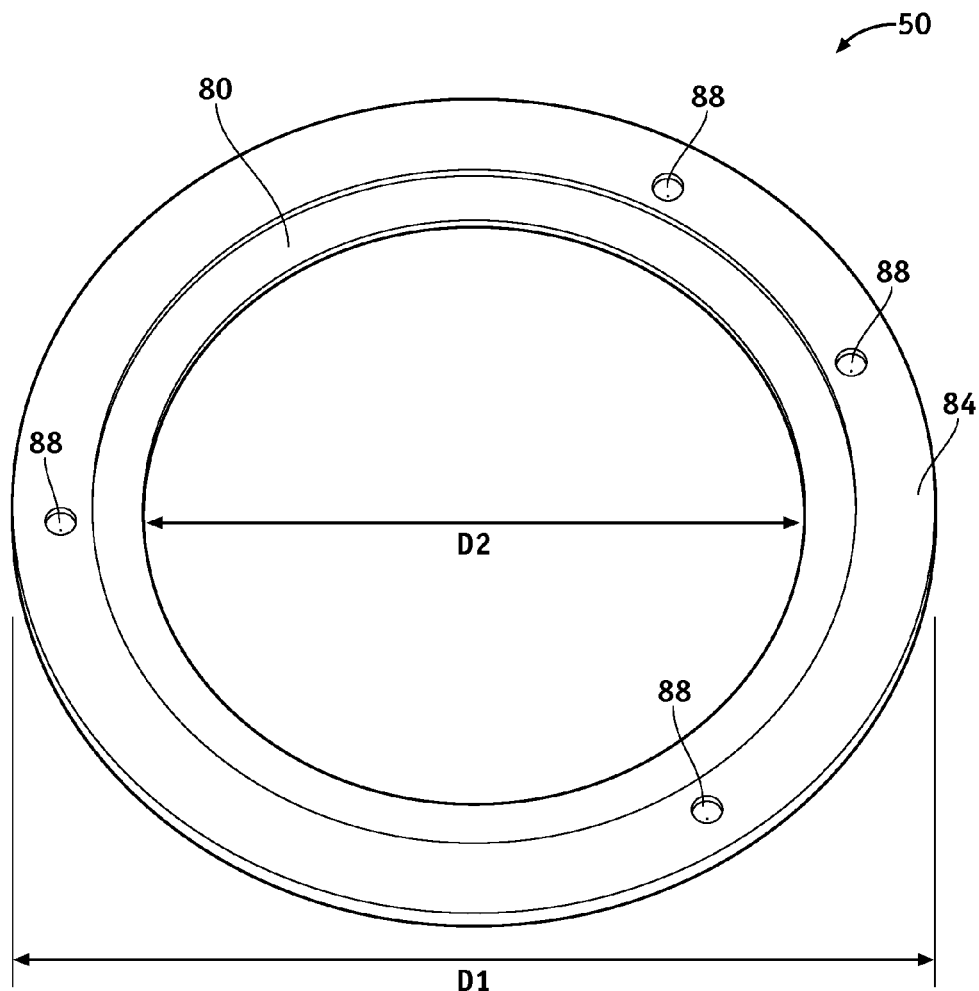
FIG. 3 is a isometric view of the balance ring depicted in FIG. 2.

FIG. 3 is an isometric view of balance ring 50 in accordance with the exemplary embodiment. Balance ring 50 has an annular shape having an outer diameter D1 and an inner diameter D2, and comprises a bi-layer composite structure that includes a first layer 80 clad to a second layer 84. First and second layers 80 and 84 may have any thickness and geometry suitable for mounting to rotor assembly 58 (FIG. 2). Ring 50 may have any number of concavities 88 of any shape or size machined into its surface to provide an asymmetric mass distribution that, when coupled to and rotating with assembly 58, compensates for rotational imbalances within assembly 58. Machining of concavities 88 may be performed by drilling or milling or by any other suitable method that removes material from ring 50 in a precise manner. During operation, balance ring 50 rotates with rotor assembly 58 and adjusts the center of mass of assembly 58, which now includes ring 50, to more closely coincide with a point on axis A-A' (FIG. 2), thus improving the rotational balance of the assembly. Ring 50 is further configured to provide magnetic shielding to rotor assembly 58 to contain magnetic flux therein, enhancing the overall efficiency of motor/generator 32.

As used herein, the term "clad" describes a particular set of processes used for joining together two sample metallic layers. A cladding process generally involves two metallic layers of differing composition, wherein the layers may include any type of contiguous metallic structure formed in any manner such as, for example, by rolling to form sheet metal samples, or by casting to form cast metal samples. Cladding involves bringing the surfaces of both samples into intimate contact with each other and using a technique such as cold roll bonding, hot roll bonding, hot pressing, explosion bonding, extrusion bonding, or the like, to create metal-to-metal contact and enhance bonding across the interface. Suitable surface pretreatments may be performed on such metal samples as a precursor to cladding to remove contaminants and/or metal oxides. Cladding does not include the joining together of minute particulates of metal such as with powdered metals using methods such as sintering, or the joining of sheet or cast samples by welding, brazing, and the like, that brings at least one of the samples to its melt temperature. Further, cladding does not include any intermediate adhesive materials used to join samples interfacially such as by gluing or soldering.

Figure 4:
FIG. 4 is a schematic view, in cross-section, of an exemplary balance ring of the type depicted in FIGS. 2 and 3.

FIG. 4 schematically illustrates, in cross-section, balance ring 50 in accordance with the exemplary embodiment. Ring 50 includes an annular base layer 84 and an annular magnetic shielding layer 80. Shielding layer 80 is clad to base layer 84 at an interface 92 in a manner to be described below. Annular base layer 84 has a concavity 88 formed into its surface by any suitable method such as by drilling or milling. The size and position of concavity 88 on ring 50 will depend upon the balance characteristics of the host rotor as previously described. Accordingly, while ring 50 is shown having a single concavity 88 of a particular size and shape, it is understood that any number of such concavities having any suitable size, shape, and/or depth may be used. Further, machining to remove metal from annular magnetic shielding layer 80 may also be similarly done as needed for a particular rotor or design.

Figure 5:
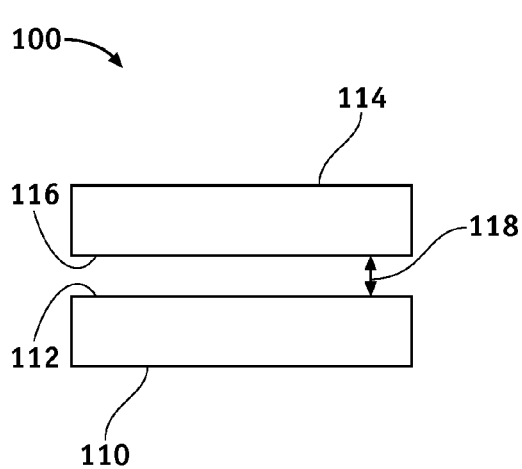
FIGS. 5-7 are schematic illustrations depicting methods for fabricating a balance ring using clad materials in accordance with an exemplary embodiment.
Figure 6:
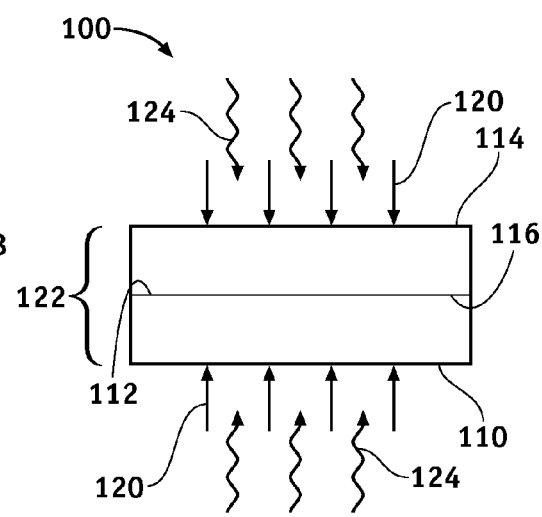
Figure 7:
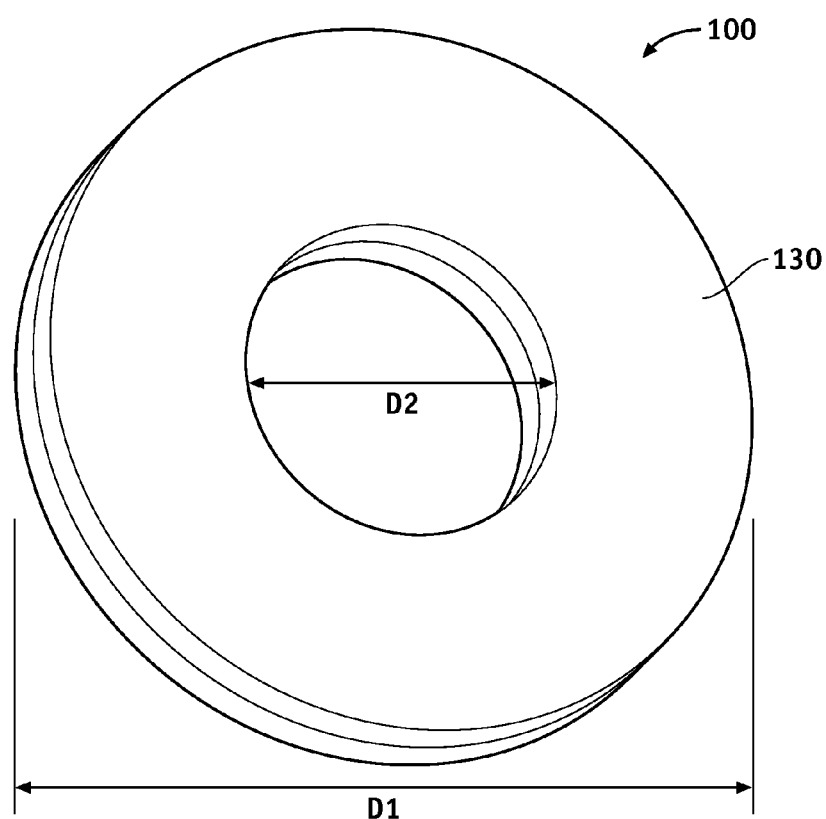

FIGS. 5-7 illustrate schematically methods for forming a balance ring 100 having an annular magnetic shielding layer clad to an annular high-strength base layer, in accordance with various exemplary embodiments of the invention. Referring to FIG. 5, in accordance with an exemplary embodiment, the method begins by providing a base layer 110 and a magnetic shielding layer 114. Layers 110 and 114 are sized appropriately for the diameter of the balance ring to be fabricated, and may have any suitable thickness. In one embodiment, base layer 110 has a thickness of about from 1 millimeter (mm) to about 20 mm, and preferably is from about 1 mm to about 10 mm thick. Magnetic shielding layer 114 has a thickness of from about 0.1 mm to about 10 mm, and preferably is from about 1 mm to about 5 mm thick. Base layer 110 has a first surface 112, and may be comprised of any high strength metal suitable for cladding such as, for example, a carbon steel. Magnetic shielding layer 114 has a second surface 116, and may be comprised of any metal having a low $\mu$ such as, for example, titanium, aluminum, stainless steel, copper, magnesium, chromium, zinc, manganese, molybdenum, and alloys thereof. In one embodiment, magnetic shielding layer 114 has a $\mu$ of from about 1 to about 2 times the magnetic permeability of a vacuum. In a preferred embodiment, magnetic shielding layer 114 has a $\mu$ of from about 1 to about 1.2 times the magnetic permeability of a vacuum. Next, a surface pretreatment suitable for the materials chosen is performed on surfaces 112 and 116 to remove any metal oxides or contaminants such as hydrocarbons that may be present thereon. Such pretreatments may include chemical treatments formulated to remove such oxides and contaminants, or abrasive treatments such as sanding or grit blasting, or a combination of these two. Grit blasting may also be used to increase surface roughness to facilitate mechanical adhesion during the subsequent cladding process. Surfaces 112 and 116 then are brought into proximity as illustrated by double arrows 118.

Following surface preparation, layers 110 and 114 are brought into contact with each other, as illustrated in FIG. 6. Pressure (as represented by arrows 120) is applied to layers 110 and 114 such as, for example, by any suitable rolling technique, so that surfaces 112 and 116 are brought into intimate metal-to-metal contact with each other to form a composite structure 122. Depending upon the overall process used, heat may also be applied (as represented by arrows 124) along with pressure to enhance the adhesive bonding strength of the resulting cladding.

Next, an annular ring 130 is formed out of composite structure 122, as illustrated in FIG. 7. Annular ring 130 may be formed by removing a portion of composite structure 122 using any suitable technique such as by, for example, a stamping process. Annular ring 130 has outer and inner diameters D1 and D2, respectively, sized in accordance with the dimensions of the host rotor assembly. Following formation, annular ring 130 may be machined in any suitable manner such as, for example, by drilling or milling, to remove material from either or both of base layer 110 and magnetic shielding layer 114 as needed to form the final balance ring. Balance ring 100 may then be mounted with magnetic shielding layer 114 disposed adjacent an end of a rotor assembly just as balance ring 50 is mounted to rotor assembly 58 (FIG. 2), to provide enhanced balance thereto when rotating.

The various embodiments of the present invention described herein provide a balance ring and methods for making a balance ring for a rotor assembly of a vehicular electric motor/generator having a magnetic shielding layer clad to a high strength base metal layer. These exemplary embodiments may be also applied to any suitable electric machine such as an electric motor or electric generator deployable in any type of vehicle. The magnetic shielding layer may comprise either a sheet or cast metal layer having a low magnetic permeability, and is configured to be mounted adjacent the rotor. The base layer may also comprise either a sheet or cast layer, and is characterized by high mechanical strength. These two layers are joined together using a conventional cladding process, and a balance ring is fabricated from the resulting composite structure. The final balance ring thereby combines both low magnetic permeability and high mechanical strength into a single composite structure without use of expensive powdered materials. The sheet or cast materials used to fabricate the resulting balance ring are easier to machine and less susceptible to crack formation.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention and the legal equivalents thereof.

What is claimed is:

1. A method for producing and mounting an annular balance ring to a rotor assembly of a vehicular electric machine, the method comprising:
   cladding a magnetic shielding layer to a base layer to produce a bi-layer composite structure by applying pressure urging the magnetic shielding layer and the base layer together while simultaneously heating the magnetic shielding layer and the base layer to produce the bi-layer composite structure;
   machining the bi-layer composite structure to define the annular balance ring; and
   mounting the annular balance ring to the rotor assembly of the vehicular electrical machine such that the magnetic shielding layer is positioned adjacent the rotor assembly.

2. The method according to claim 1 further comprising chemically pre-treating at least one of the magnetic shielding layer and the base layer to remove any oxides and containments present thereon prior to cladding the magnetic shielding layer to the base layer.

3. The method according to claim 1 further comprising subjecting at least one of the magnetic shielding layer and the base layer to an abrasive treatment to increase surface roughness prior to cladding the magnetic shielding layer to the base layer.

4. The method according to claim 1 wherein the magnetic shielding layer and the base layer are each selected from the group consisting of a metal sheet and a metal casting.

5. The method according to claim 4 wherein the magnetic shielding layer and the base layer each comprise a metal casting.

6. The method according to claim 1 further comprising selectively removing material from the annular balance ring to compensate for asymmetries in the mass distribution of the rotor assembly to which the annular balance ring is mounted.

7. The method according to claim 1 wherein mounting comprises press-fitting the annular balance ring onto an end portion of the rotor assembly.

8. A method for producing and mounting an annular balance ring to a vehicular electric machine, the method comprising:
   cladding a magnetic shielding layer to a base layer to produce a bi-layer composite structure;
   utilizing a stamping process to remove a central portion of the bi-layer composite structure to generally define the annular balance ring; and
   mounting the annular balance ring to the rotor assembly of the vehicular electrical machine such that the magnetic shielding layer is positioned adjacent the rotor assembly.

9. The method according to claim 8 further comprising machining the annular balance ring to impart the annular base layer with an inner diameter greater than the inner diameter of the magnetic shielding layer.

10. A method for producing and mounting an annular balance ring to a vehicular electric machine, the method comprising:
   cladding a magnetic shielding layer to a base layer to produce a bi-layer composite structure, the base layer comprising carbon steel, and the magnetic shielding layer comprising a material having a magnetic permeability from about 1 to about 1.2 times the magnetic permeability of a vacuum; and
   machining the bi-layer composite structure to define the annular balance ring; and
   mounting the annular balance ring to the rotor assembly of the vehicular electrical machine such that the magnetic shielding layer is positioned adjacent the rotor assembly.

* * * * *